United States Patent
Cosoi (10) Patent No.: US 8,572,184 B1
(45) Date of Patent: Oct. 29, 2013

(54) SYSTEMS AND METHODS FOR DYNAMICALLY INTEGRATING HETEROGENEOUS ANTI-SPAM FILTERS

(75) Inventor: Catalin A. Cosoi, Buzau (RO)

(73) Assignee: BITDEFENDER IPR Management Ltd., Nicosia (CY)

( * ) Notice: Subject to any disclaimer, the term of this patent is extended or adjusted under 35 U.S.C. 154(b) by 1165 days.

(21) Appl. No.: 11/867,547

(22) Filed: Oct. 4, 2007

(51) Int. Cl.
G06F 15/16 (2006.01)
G06F 15/173 (2006.01)

(52) U.S. Cl.
USPC .......................................... 709/206; 709/224

(58) Field of Classification Search
USPC .......................................... 709/207, 206, 224
See application file for complete search history.

(56) References Cited

U.S. PATENT DOCUMENTS

| | | | |
|---|---|---|---|
| 4,914,708 A | 4/1990 | Carpenter et al. | |
| 5,040,214 A | 8/1991 | Grossberg et al. | |
| 5,133,021 A | 7/1992 | Carpenter et al. | |
| 5,142,590 A | 8/1992 | Carpenter et al. | |
| 5,157,738 A | 10/1992 | Carpenter et al. | |
| 5,214,715 A | 5/1993 | Carpenter et al. | |
| 5,218,646 A | 6/1993 | Sirat et al. | |
| 5,311,601 A | 5/1994 | Carpenter et al. | |
| 5,361,353 A | 11/1994 | Carr et al. | |
| 5,619,619 A | 4/1997 | Shinohara et al. | |
| 5,627,748 A | 5/1997 | Baker | |
| 5,680,475 A | 10/1997 | Zwierski et al. | |
| 6,023,723 A | 2/2000 | McCormick et al. | |
| 6,052,709 A | 4/2000 | Paul | |
| 6,161,130 A | 12/2000 | Horvitz et al. | |
| 6,373,971 B1 | 4/2002 | Floratos | |
| 6,415,286 B1 | 7/2002 | Passera et al. | |
| 6,421,709 B1 * | 7/2002 | McCormick et al. | 709/206 |
| 6,533,822 B2 | 3/2003 | Kupiec | |
| 6,542,635 B1 | 4/2003 | Hu et al. | |
| 6,564,202 B1 | 5/2003 | Schuetze et al. | |
| 6,571,230 B1 | 5/2003 | Parida | |
| 6,598,054 B2 | 7/2003 | Schuetze et al. | |
| 6,654,787 B1 | 11/2003 | Aronson et al. | |
| 6,687,740 B1 | 2/2004 | Gough et al. | |
| 6,701,305 B1 | 3/2004 | Holt et al. | |
| 6,708,205 B2 | 3/2004 | Sheldon et al. | |
| 6,714,874 B1 | 3/2004 | Myers | |
| 6,718,368 B1 | 4/2004 | Ayyadurai | |
| 6,772,196 B1 | 8/2004 | Kirsch | |

(Continued)

OTHER PUBLICATIONS

Cosoi, U.S. Appl. No. 11/497,662, filed Aug. 1, 2006.

(Continued)

*Primary Examiner* — Aaron Strange
(74) *Attorney, Agent, or Firm* — Law Office of Andrei D Popovici, PC (57) ABSTRACT

In some embodiments, a spam filtering method includes computing the relevance of each of a plurality of anti-spam filters according to a relevance parameter set, and deciding whether an electronic message is spam or non-spam according to the relevancies and individual classification scores generated by the anti-spam filters. The relevance of an anti-spam filter indicates the degree to which a classification score produced by that particular filter determines the final classification of a given message. The relevance parameter set of each anti-spam filter may include, among others, a training maturity indicative of the degree of training of the filter, a filter update age indicative of the time elapsed since the latest update of the filter, a false-positive classification indicator, and a false-negative classification indicator of the anti-spam filter.

16 Claims, 5 Drawing Sheets

(56) References Cited

U.S. PATENT DOCUMENTS

| | | | |
|---|---|---|---|
| 6,901,398 B1 * | 5/2005 | Horvitz et al. | 709/207 |
| 6,941,321 B2 | 9/2005 | Schuetze et al. | |
| 6,963,869 B2 | 11/2005 | Burrows | |
| 6,988,093 B2 | 1/2006 | Pic et al. | |
| 7,076,527 B2 | 7/2006 | Bellegarda et al. | |
| 7,130,850 B2 | 10/2006 | Russell-Falla et al. | |
| 7,178,099 B2 | 2/2007 | Meyer et al. | |
| 7,203,680 B2 | 4/2007 | Parida | |
| 7,257,564 B2 | 8/2007 | Loughmiller et al. | |
| 7,349,901 B2 * | 3/2008 | Ramarathnam et al. | 707/6 |
| 7,519,565 B2 | 4/2009 | Prakash et al. | |
| 7,555,523 B1 | 6/2009 | Hartmann | |
| 7,577,656 B2 | 8/2009 | Kawai et al. | |
| 7,610,342 B1 * | 10/2009 | Pettigrew et al. | 709/206 |
| 7,617,285 B1 * | 11/2009 | Hartmann | 709/206 |
| 7,836,134 B2 | 11/2010 | Pantalone | |
| 7,890,441 B2 | 2/2011 | Prakash et al. | |
| 7,945,627 B1 | 5/2011 | Musat | |
| 2002/0078349 A1 | 6/2002 | Marso et al. | |
| 2002/0188672 A1 | 12/2002 | Janssen et al. | |
| 2003/0135555 A1 | 7/2003 | Birrel et al. | |
| 2003/0220978 A1 | 11/2003 | Rhodes | |
| 2004/0083270 A1 | 4/2004 | Heckerman | |
| 2004/0167968 A1 | 8/2004 | Wilson et al. | |
| 2004/0177110 A1 | 9/2004 | Rounthwaite et al. | |
| 2004/0221012 A1 | 11/2004 | Heumesser | |
| 2004/0260776 A1 | 12/2004 | Starbuck | |
| 2005/0076084 A1 | 4/2005 | Loughmiller | |
| 2005/0193073 A1 | 9/2005 | Mehr et al. | |
| 2005/0198160 A1 | 9/2005 | Shannon et al. | |
| 2005/0198166 A1 | 9/2005 | Kawaji | |
| 2005/0198182 A1 | 9/2005 | Prakash et al. | |
| 2005/0262209 A1 | 11/2005 | Yu | |
| 2006/0010217 A1 * | 1/2006 | Sood | 709/206 |
| 2006/0015561 A1 * | 1/2006 | Murphy et al. | 709/206 |
| 2006/0015563 A1 | 1/2006 | Judge et al. | |
| 2006/0031319 A1 | 2/2006 | Nelson et al. | |
| 2006/0053203 A1 * | 3/2006 | Mijatovic | 709/206 |
| 2006/0095521 A1 | 5/2006 | Patinkin | |
| 2006/0174345 A1 | 8/2006 | Flanagan | |
| 2006/0179052 A1 | 8/2006 | Pauws | |
| 2007/0011323 A1 | 1/2007 | Gaal | |
| 2007/0061402 A1 | 3/2007 | Mehr et al. | |
| 2007/0130262 A1 | 6/2007 | Williams et al. | |
| 2007/0255792 A1 | 11/2007 | Gronberg | |
| 2008/0059590 A1 | 3/2008 | Sarafijanovic et al. | |
| 2008/0077570 A1 | 3/2008 | Tang et al. | |
| 2008/0140781 A1 | 6/2008 | Bocharov et al. | |
| 2008/0168144 A1 | 7/2008 | Lee | |
| 2008/0215692 A1 | 9/2008 | Bosarge et al. | |
| 2009/0164598 A1 | 6/2009 | Nelson et al. | |

OTHER PUBLICATIONS

Musat, U.S. Appl. No. 11/536,370, filed Sep. 28, 2006.
Musat, U.S. Appl. No. 11/933,515, filed Nov. 1, 2007.
USPTO, Office Action mailed Jul. 23, 2009 for U.S. Appl. No. 11/536,370, filed Sep. 28, 2006.
USPTO, Office Action mailed Aug. 20, 2009 for U.S. Appl. No. 11/497,662, filed Aug. 1, 2006.
USPTO, Office Action mailed Mar. 4, 2010 for U.S. Appl. No. 11/536,370, filed Sep. 28, 2006.
USPTO, Office Action mailed Mar. 9, 2010 for U.S. Appl. No. 11/497,662, filed Aug. 1, 2006.
USPTO, Office Action mailed May 27, 2010 for U.S. Appl. No. 11/933,515, filed Nov. 1, 2007.
Androtsopoulos, "Learning to Filter Spam: A Comparison of Naive Bayesian and a Memory-Based Approach," Proc. Workshop "Machine Learning and Textual Information Access," 4th European Conference on Principles and Practice of Knowledge Discovery in Databases, Lyon, France, p. 1-13, Sep. 2000.
Berkhin, "A Survey of Clustering Data Mining Techniques", p. 1-56, Accrue Software Inc., Fremont, CA, 2002; the year of publication is sufficiently earlier than the effective U.S. filing date and any foreign priority date so that the particular month of publication is not in issue.
Burges, "A Tutorial on Support Vector Machines for Pattern Recognition", Data Mining and Knowledge Discovery, Kluwer Academic Publishers, Boston, MA, 2:121-167, 1998; the year of publication is sufficiently earlier than the effective U.S. filing date and any foreign priority date so that the particular month of publication is not in issue.
Carpenter et al., "Adaptive Resonance Theory", Handbook of Brain Theory and Neural Networks, Second Edition, MIT Press, Cambridge, MA, p. 1-12, 2003; the year of publication is sufficiently earlier than the effective U.S. filing date and any foreign priority date so that the particular month of publication is not in issue.
Chinneck, J.W., "Chapter 14: Heuristics for Discrete Search: Genetic Algorithms and Stimulated Annealing," Practical Optimization: a Gentle Introduction, p. 1-10, Carleton University, Ottawa, Canada, Oct. 2006.
Cormode et al., "The string edit distance matching problem with moves," ACM Transactions on Algorithms (TALG), 3(1):667-676, ACM, New York, NY, Feb. 2007.
Cosoi, "An Anti-Spam Filter Based on Adaptive Neural Networks," p. 1-8, 2006 MIT Spam Conference, Cambridge, MA, presented Mar. 28, 2006.
Cosoi, "Methods for Dynamically Combining Relevancies of Different Antispam Filters," 2007 MIT Spam Conference, Boston MA, p. 1-10, Mar. 30, 2007.
Cover, "Estimation by the Nearest Neighbor Rule," IEEE Transactions on Information Theory, vol. IT-14, No. 1, p. 50-55, IEEE Information Theory Society, IEEE, New York, NY, Jan. 1968.
Cukier et al., "Genres of Spam: Expectations and Deceptions," Proc. 39th Hawaii International Conference on System Sciences, Kauai, HI, p. 1-10, Jan. 7, 2006.
Dixit et al., "Lohit: An Online Detection & Control System for Cellular SMS Spam", Proc. IASTED Intl. Conf. Comm., Network, and Information Security, p. 48-54, Phoenix, AZ, Nov. 2005.
Dulucq, S. et al., "Analysis of Tree Edit Distance Algorithms," Lecture Notes in Computer Science 2676, Springer Berlin Heidelberg, Germany, p. 83-95, 2003; the year of publication is sufficiently earlier than the effective U.S. filing date and any foreign priority date so that the particular month of publication is not in issue.
Ekin et al., "Distance-based classification methods", INFOR J. 37(3):337-352, Canada Operation Research Society, Toronto, Canada, 1999; the year of publication is sufficiently earlier than the effective U.S. filing date and any foreign priority date so that the particular month of publication is not in issue.
Floratos, A., "Pattern Discovery in Biology: Theory and Applications," p. 1-250, New York University, New York, NY, Jan. 1999.
Gilad-Bachrach, R., et al., Margin Based Feature Selection—Theory and Algorithms, Proceedings of the 21st International Conference on Machine Learning, 2004, p. 1-8, Banff, Canada; the year of publication is sufficiently earlier than the effective U.S. filing date and any foreign priority date so that the particular month of publication is not in issue.
Graham, "A Plan for Spam," Aug. 2002. Downloaded from http://www.paulgraham.com/spam.html.
Han et al., "Automatic Document Metadata Extraction using Support Vector Machines", Proc. 3rd ACM/IEEE-CS Joint Conf on Digital Libraries, Houston TX, p. 37-48, 2003; the year of publication is sufficiently earlier than the effective U.S. filing date and any foreign priority date so that the particular month of publication is not in issue.
IETF, "RFC 2045, Multipurpose Internet Mail Extensions (MIME) Part One: Format of Internet Message Bodies," p. 1-27, Internet Engineering Task Force, Fremont, CA, Nov. 1996.
Kerremans, Towards Ontology-Based E-mail Fraud Detection, Proc. EPIA, Covilha, Portugal, p. 106-111, 2005; the year of publication is sufficiently earlier than the effective U.S. filing date and any foreign priority date so that the particular month of publication is not in issue.
Kurtz, S., "Suffix Trees," Effiziente Algorithmen auf Sequenzen, University of Hamburg, Hamburg, Germany, p. 1-25, Dec. 1, 2005.
Lee et al., "Spam Deobfuscation using a Hidden Markov Model", Proc. 2nd Conf. on Email and Anti-Spam, Stanford, CA, 2005; the year of publication is sufficiently earlier than the effective U.S. filing date and any foreign priority date so that the particular month of publication is not in issue.

(56) References Cited

OTHER PUBLICATIONS

Lundberg, "Uninvited, Unwelcome Medical Email Messages," Medscape Today, www.medscape.com/viewarticle/465734?rss, WebMD, New York, NY, Posted Dec. 16, 2003.

von Luxburg et al., "Distance-Based Classification with Lipschitz Functions",The Journal of Machine Learning Research, JMLR. ORG, USA, 5:669-695, Dec. 2004.

Macqueen, "Some methods for classification and analysis of multivariate observations", Proc. 5th Berkeley Symp. on Math. Statist. and Prob., vol. 1, p. 281-297, Berkeley, CA, 1967; the year of publication is sufficiently earlier than the effective U.S. filing date and any foreign priority date so that the particular month of publication is not in issue.

Manco et al., "Towards an Adaptive Mail Classifier", Italian Association for Artifficial Intelligence Workshop, Italy, 2002; the year of publication is sufficiently earlier than the effective U.S. filing date and any foreign priority date so that the particular month of publication is not in issue.

Mao et al., "Logical Entity Recognition in Multi-Style Document Page Images," Proc.18th Intl. Conf. on Pattern Recognition (ICPR'06), Hong Kong, China, vol. 01 p. 876-87, Sep. 2006.

Miller, "Neural Network-Based Antispam Heuristics," Symantec Enterprise Security white paper, p. 1-8, Symantec, Mountain View, CA, 2003; the year of publication is sufficiently earlier than the effective U.S. filing date and any foreign priority date so that the particular month of publication is not in issue.

Ng et al., "Efficient and Effective Clustering Methods for Spatial Data Mining", Proc. 20th VLDB Conference, Santiago, Chile, p. 144-155, 1994; the year of publication is sufficiently earlier than the effective U.S. filing date and any foreign priority date so that the particular month of publication is not in issue.

Parida, L. et al., "An Output- Sensitive Flexible Pattern Discovery Algorithm," 2089:131-142, Springer-Verlag Berlin Heidelberg, Germany, 2001; the year of publication is sufficiently earlier than the effective U.S. filing date and any foreign priority date so that the particular month of publication is not in issue.

Rajasekaran, S., Algorithms for Motif Search, p. 1-22, CRC Press, Boca Raton, FL, 2001; the year of publication is sufficiently earlier than the effective U.S. filing date and any foreign priority date so that the particular month of publication is not in issue.

Rigoutsos, I., et al., "Chung-Kwei: a Pattern-discovery-based System for the Automatic Identification of Unsolicited E-mail Messages (SPAM)," p. 1-8, CEAS 2004, Mountain View, CA, Jul. 30-31, 2004.

Rigoutsos, I. et al., Combinatorial pattern discovery in biological sequences: the Teiresias algorithm, Bioinformatics, p. 55-67, vol. 14 No. 1, Oxford University Press, Oxford, UK, Dec. 15, 1997.

Ristad et al., "Learning string-edit distance", IEEE Trans. Pattern Analysis and Machine Intelligence, 20(5):522-532, IEEE, New York, NY, 1998; the year of publication is sufficiently earlier than the effective U.S. filing date and any foreign priority date so that the particular month of publication is not in issue.

Seidl et al., "Optimal multi-step k-nearest neighbor search", Proc. 1998 ACM SIGMOD Intl. Conf. on Management of Data, Seattle WA, 27(2):154-165, Jun. 1998.

Tan, "Adaptive Resonance Associative Map: A Hierarchical Art System for Fast Stable Associative Learning," IJCNN Conf. on Neural Networks, Baltimore MD, p. I-860-865, Jun. 1992.

Tan, "Cascade ARTMAP: Integrating Neural Computation and Symbolic Knowledge Processing," IEEE Trans. Neural Networks 8(2):237-250, IEEE, New York, NY, Mar. 1997.

Verzi, "Hierarchical ARTMAP," Proc. Int. Joint Conf. on Neural Networks, IJCNN2000, Como, Italy, p. 41-46, Jul. 2000.

Vilo, J., "Pattern Discovery from Biosequences," Report A-2002-3, p. 1-158, Helsinki University Printing House, Finland, 2002; the year of publication is sufficiently earlier than the effective U.S. filing date and any foreign priority date so that the particular month of publication is not in issue.

Wang, J. et al., "Toward Automated E-mail Filtering-an Investigation of Commercial and Academic Approaches," TANET 2003 Conference, Taipei, Taiwan, 2003; the year of publication is sufficiently earlier than the effective U.S. filing date and any foreign priority date so that the particular month of publication is not in issue.

Weenink, "Category ART: A Variation on Adaptive Resonance Theory Neural Networks," Proc. Inst. Phonetic Sci., Univ. of Amsterdam, Amsterdam, Netherlands, 21:117-129, 1997; the year of publication is sufficiently earlier than the effective U.S. filing date and any foreign priority date so that the particular month of publication is not in issue.

Zhang et al., "Location-Based Spatial Queries", ACM SIGMOD 2003, p. 443-454, San Diego, California, USA, Jun. 2003.

Zhang, Y. et al., "An Automated Classification Algorithm for Multi-Wavelength Data," p. 1-8, Proc. SPIE 2004, SPIE, Bellingham, WA, 2004; the year of publication is sufficiently earlier than the effective U.S. filing date and any foreign priority date so that the particular month of publication is not in issue.

USPTO, Office Action mailed Sep. 15, 2010 for U.S. Appl. No. 11/536,370, filed Sep. 28, 2006.

USPTO, Office Action mailed Sep. 17, 2010 for U.S. Appl. No. 11/497,662, filed Aug. 1, 2006.

USPTO, Office Action mailed Dec. 10, 2010 for U.S. Appl. No. 11/933,515, filed Nov. 1, 2007.

USPTO, Office Action mailed Apr. 18, 2011 for U.S. Appl. No. 11/497,662, filed Aug. 1, 2006.

Musat, U.S. Appl. No. 13/095,350, filed Apr. 27, 2011.

Musat, U.S. Appl. No. 13/095,316, filed Apr. 27, 2011.

USPTO, Office Action mailed Jun. 17, 2011 for U.S. Appl. No. 11/933,515, filed Nov. 1, 2007.

USPTO, Office Action mailed Jul. 20, 2011 for U.S. Appl. No. 13/095,350, filed Apr. 27, 2011.

\* cited by examiner

SYSTEMS AND METHODS FOR DYNAMICALLY INTEGRATING HETEROGENEOUS ANTI-SPAM FILTERS

BACKGROUND

The invention relates to methods and systems for classifying electronic communications, and in particular to systems and methods for filtering unsolicited commercial electronic messages (spam).

Unsolicited commercial electronic communications have been placing an increasing burden on the users and infrastructure of electronic mail (email), instant messaging, and phone text messaging systems. Unsolicited commercial email, commonly termed spam or junk email, forms a significant percentage of all email traffic worldwide. Email spam takes up valuable network resources, affects office productivity, and is considered annoying and intrusive by many computer users.

Software running on an email user's or email service provider's system may be used to classify email messages as spam or non-spam. Several approaches have been proposed for identifying spam messages, including matching the message's originating address to lists of known offending or trusted addresses (techniques termed black- and white-listing, respectively), searching for certain words or word patterns (e.g., Viagra®, weight loss, aggressive buy), and analyzing message headers.

Experienced spammers have developed countermeasures to such classification tools, such as misspelling certain words (e.g., Vlagra), inserting unrelated text in spam messages, and using digital images of words or phrases instead of actual text The efficiency of existing spam detection methods often decreases in time, since the form and content of spam messages change rapidly. As spammer countermeasures become increasingly complex, successful detection may benefit from increasingly sophisticated identification techniques.

SUMMARY

According to one aspect, a spam filtering method comprises computing a first relevance of a first anti-spam filter according to a first relevance parameter set including a first training maturity of the first filter and a first filter update age of the first filter, computing a second relevance of a second anti-spam filter according to a second relevance parameter set including a second training maturity of the second filter and a second filter update age of the second filter, and determining whether an electronic communication is spam or non-spam according to a first result generated by applying the first anti-spam filter to the electronic communication, a second result generated by applying the second anti-spam filter to the electronic communication, the first relevance, and the second relevance.

According to another aspect, a spam filtering method comprises computing a first relevance of a first anti-spam filter according to a first relevance parameter set including a first filter update age of the first filter, a first false-positive classification indicator of the first filter, and a first false-negative classification indicator of the first filter, computing a second relevance of a second anti-spam filter according to a second relevance parameter set including a second filter update age of the second filter, a second false-positive classification indicator of the second filter, and a second false-negative classification indicator of the second filter, and determining whether an electronic communication is spam or non-spam according to a first result generated by applying the first anti-spam filter to the electronic communication, a second result generated by applying the second anti-spam filter to the electronic communication, the first relevance, and the second relevance.

BRIEF DESCRIPTION OF THE DRAWINGS

The foregoing aspects and advantages of the present invention will become better understood upon reading the following detailed description and upon reference to the drawings where:

FIG. 2-A illustrates an exemplary classification subsystem distinct from a messaging application, according to some embodiments of the present invention.

FIG. 2-B illustrates an exemplary classification subsystem forming part of a messaging application, according to some embodiments of the present invention.

FIG. 6-A shows an exemplary time-evolution of the relevance of an anti-spam filter in the absence of updates, according to some embodiments of the present invention.

FIG. 6-B shows an exemplary time-evolution of the relevance of an anti-spam filter undergoing continuous client-side training, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, the term spam is not limited to email spam, but encompasses non-legitimate or unsolicited commercial electronic communications such as email, instant messages, and phone text and multimedia messages, among others. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
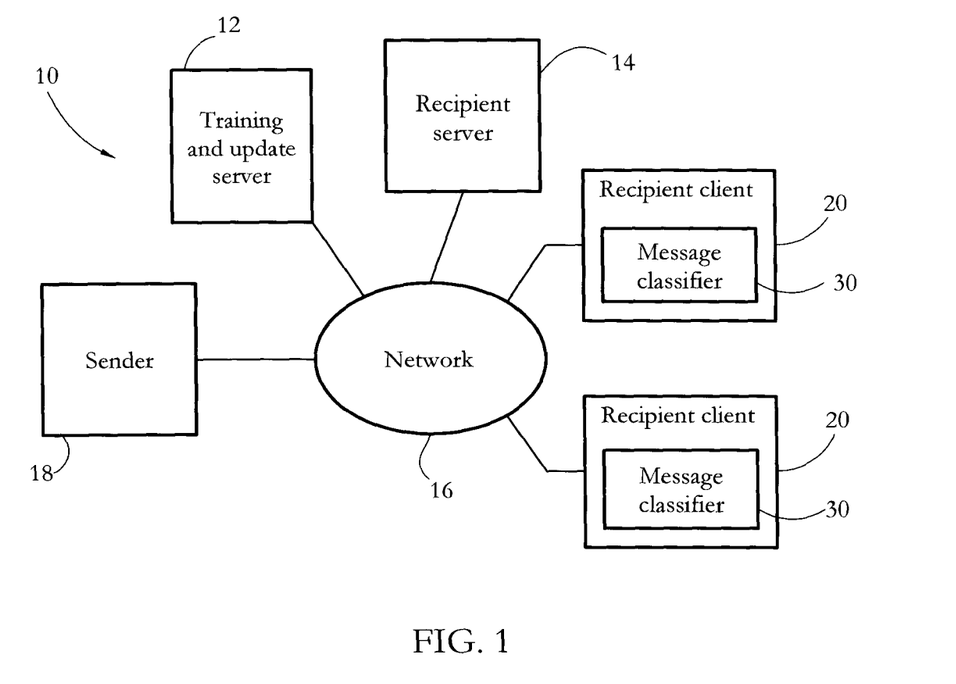
FIG. 1 shows an exemplary electronic communication system including multiple client computers, each having a message classification subsystem (e.g. software application) according to some embodiments of the present invention.

FIG. 1 shows an electronic communication and classification system 10 according to some embodiments of the present invention. System 10 may be an electronic mail (email), instant messaging (IM), mobile telephone, or other electronic communication system. For clarity, the following discussion will focus in particular on an electronic email system. System 10 includes a sender computer system 18, a recipient mail server 14, a training and update server 12, and a plurality of recipient client systems 20. Sender system 18 may include a sender mail server and/or one or more sender client computer systems. A network 16 connects sender system 18, recipient mail server 14, training and update server 12, and recipient client systems 20. Network 16 may be a wide-area network such as the Internet. Parts of network 16, for example a part of network 16 interconnecting recipient client systems 20, may also include a local area network (LAN). Each recipient client system 20 includes a message classifier 30 computer program, which is used to classify electronic communications as described in detail below.

An email message sent by sender system 18 to one or more email addresses is received at recipient mail server 14, and then sent or made available otherwise (e.g. through a web interface) to recipient client systems 20.

Figure 2:
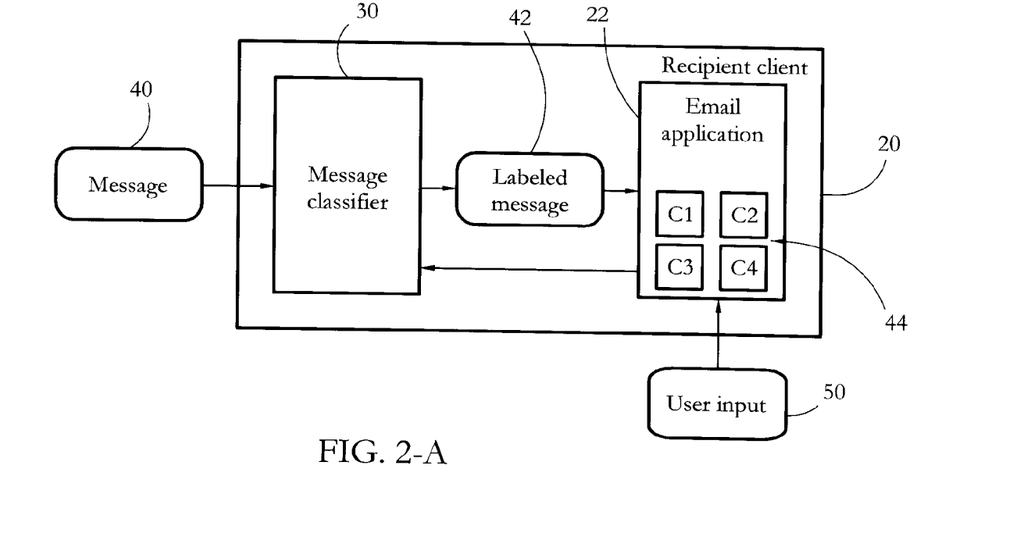

FIG. 2-A shows an exemplary recipient client system 20 including a message classifier 30 computer program separate from an email application 22, according to some embodiments of the present invention. In some embodiments, message classifier 30 may be a stand-alone application, or may be an anti-spam module of a security suite having antivirus, firewall, and other modules. Message classifier 30 receives an email message 40, and transfers a labeled (classified) message 42 to email application 22. The labeled message may include a class label, which may be placed in a header field of labeled message 42. In some embodiments, message classifier 30 may transfer to email application 22 a class label and an indicator of an association of the class label to message 40.

Message 40 is assigned to one of a plurality of classes 44 (labeled C1-C4 in FIG. 2-A) by message classifier 30. In some embodiments, classes 44 include one or more classes of unsolicited commercial email (spam), and one or more classes of non-spam (legitimate or unknown) email. In a simple embodiment, classes 44 may include spam and non-spam. In some embodiments, classes of legitimate email may include personal and work, while spam classes may include product offers and phishing, among others. Some embodiments of email application 22 associate classes 44 with individual email folders. A user may interact with classification engine 30 and/or email application 22 to manually alter the classification of any message, for example by moving the message from one folder to another. In some embodiments, email application 22 feeds the details of the user interaction back to message classifier 30.

FIG. 2-B shows an exemplary recipient client computer system 120 including a message classifier 130 integrated within an email application 122. Message 40 received by message classifier 130 is directed to one of a plurality of classes (folders) 144 directly by message classifier 130 or by other routines of email application 122. Classes 144 may include one or more spam classes and one or more non-spam classes. A user may interact with email application 122 to manually alter the classification of given messages.

Figure 3:
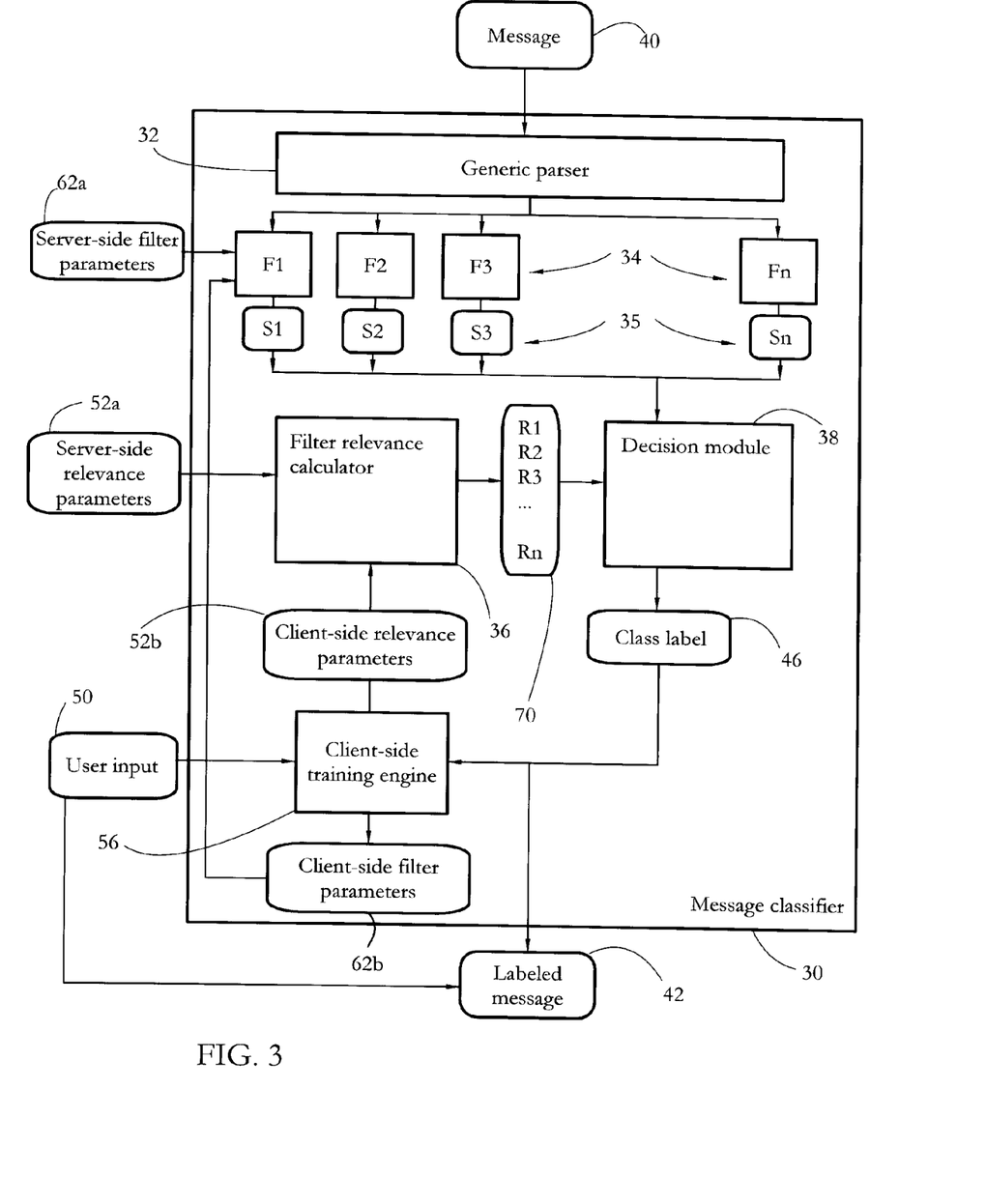
FIG. 3 shows an exemplary internal structure of a message classifier, according to some embodiments of the present invention.

FIG. 3 shows an exemplary internal structure and operational diagram of a message classifier 30 according to some embodiments of the present invention. Message classifier 30 includes a generic parser 32, a plurality of anti-spam filters 34 (labeled F1-Fn in FIG. 3) connected to generic parser 32, a decision module 38 connected to anti-spam filters 34, a filter relevance calculator 36 connected to decision module 38, and a client-side training engine 56 connected to decision module 38 and filter relevance calculator 36. Message classifier 30 inputs incoming message 40 and outputs labeled message 42.

In some embodiments, generic parser 32 receives message 40 and processes it into a form which is suitable as input for the various anti-spam filters 34. For example, generic parser 32 may break up message 40 into constituent parts (e.g. header, text body, images, MIME parts, etc.).

Anti-spam filters 34 input message data from generic parser 32, together with a set of server-side filter parameters 62a and a set of client-side filter parameters 62b. Each anti-spam filter 34 produces a classification score 35 (denoted S1-Sn in FIG. 3). In some embodiments, anti-spam filters 34 may input message 40 directly, bypassing generic parser 32.

Filter parameters 62a-b are functional variables that control the performance of anti-spam filters 34. Examples of filter parameters include a number of neurons per layer and neuronal weights of a neural network-based filter, the position of cluster centers in a k-means-based classifier, and the number and position of color histogram bins in an image-processing filter. In some embodiments, anti-spam filters 34 may be trained (optimized) to improve spam-detection performance by varying the values of filter parameters 62a-b. Filters 34 may be trained at training and update server 12 or at each recipient client 20 (FIG. 1). In an exemplary embodiment, an anti-spam filter 34 specialized in image spam detection may be trained on a large database of sample images. Such a database may not be available to the client, so the operation of that particular anti-spam filter may be optimized at training and update server 12. The result of the training process is a set of server-side filter parameters 62a, which are made available to message classifier 30 residing on recipient client 20. In another exemplary embodiment, a Bayesian classifier may reflect the user's individualized preferences regarding spam, and therefore may be trained at recipient client 20. Message classifier 30 may allow the user to manually classify a number of messages 40, thus inferring a user-specific definition of spam. Client-side training results in a set of optimal client-side filter parameters 62b. In some embodiments, an anti-spam filter 34 may employ both server-side and client-side filter parameters. For example, parameters describing the structure and basic operation of the filter may be server-side, while the selectivity (spam tolerance level) of the filter may be adjusted by the user, and therefore may be client-side. In some embodiments, server-side filter parameters 62a may be downloaded by clients via periodic or on-demand software updates over network 16 (FIG. 1).

In some embodiments, any change in filter parameters 62a-b is considered a filter update. A filter update may be registered at the time of a software update (changes in server-side filter parameters 62a) or when a user manually classifies an incoming message (changes in client-side filter parameters 62b).

Each classification score 35 is an indication of a class assignment of message 40 according to the anti-spam filter 34 that computed the classification score. In some embodiments, each classification score 35 is a number between 0 and 1 showing the probability that message 40 belongs to a certain class 44. In some embodiments, classification scores 35 may have binary values (e.g., 1/0, yes/no) or continuous values.

For example, in an embodiment with two classes 44 (spam and non-spam), a classification score of 0.85 produced by a certain anti-spam filter 34 may indicate that the respective message has an 85% chance of being spam according to that particular anti-spam filter. In an embodiment with k>2 classes 44, each classification score 35 may be a string of k numbers, $S_i=\{S_i^1, S_i^2, \ldots, S_i^k\}$, $1 \leq i \leq n$, where $S_i^j$ represents the probability that the message belongs to class j, according to anti-spam filter i.

Decision module 38 inputs individual classification scores 35 from anti-spam filters 34 and filter relevancies 70 (labeled $R_1, R_2, \ldots R_n$ in FIG. 3) from filter relevance calculator 36 and outputs a class label 46 indicating the class assignment of message 40. In some embodiments, class label 46 forms part of labeled message 42. Individual scores 35 returned by anti-spam filters 34 are integrated into a combined classification score, according to the respective filter relevancies 70. In some embodiments, a combined classification score S is computed as a weighted sum of individual classification scores 35, wherein the weights are the respective filter relevancies 70:

$$S = \sum_{i=1}^{n} R_i S_i, \quad [1]$$

wherein n denotes the number of anti-spam filters 34. In an embodiment with k classes 44, in which individual classification scores 35 are denoted by $S_i=\{S_i^1, S_i^2, \ldots, S_i^k\}$, $1 \leq i \leq n$, the combined classification score S may be a string of k numbers, $S=\{S^1, S^2, \ldots, S^k\}$, wherein $$S^j = \sum_{i=1}^{n} R_i S_i^j$$

and n stands for the number of anti-spam filters 34. In some embodiments, decision module 38 compares the combined classification score to a pre-defined threshold in order select a class assignment for message 40. For example, a message 40 may receive the class label "spam" if the combined score S exceeds a certain value, e.g. 0.75.

Filter relevance calculator 36 receives relevance parameter set 52a-b and outputs the relevance 70 of each anti-spam filter 34 to decision module 38. In some embodiments, relevance 70 is a number between 0 and 1 which represents the degree to which the classification score 35 of a given anti-spam filter 34 determines the final class assignment of a message 40. In some embodiments, the set of relevancies 70 is scaled so that $$\sum_{i=1}^{n} R_i = 1,$$

wherein n denotes the number of anti-spam filters 34.

The calculation of relevancies 70 proceeds according to relevance parameter sets 52a-b, which may include server-side relevance parameters 52a and/or client-side relevance parameters 52b evaluated at training and update server 12 and at recipient client 20, respectively.

In some embodiments, relevance parameter sets 52a-b include a training maturity M, a filter update age T, a filter aging speed indicator A, a false positive classification indicator P, a false negative classification indicator N, and a filter confidence C for each filter 34.

The training maturity M is a number which quantifies the degree of training of the respective anti-spam filter 34. In some embodiments, the training maturity M is a number between 0 and 1, wherein a value of 1 indicates a fully trained filter. In some embodiments, training maturity M may be related to the false-positive and false-negative classification rates of anti-spam filter 34. For example, M may have a value of 1 if both the false-positive and false-negative classification rates of the respective filter are nil. In some embodiments, training maturity M may increase with each successful classification by the respective filter, or with the total number of messages used to train the respective filter. In some embodiments, the training maturity M is computed according to the ratio between the number of spam and the number of legitimate messages classified by the filter. For example, a filter may be considered fully trained (M=1) after it has successfully classified 500,000 spam messages and 500,000 legitimate messages. In some embodiments, the calculation method for the filter training maturity M is filter-specific. For example, the number of correctly classified messages required for a filter to become fully trained may depend on the type of anti-spam filter: a Bayes filter may need a training set of 20,000 messages, whereas an anti-spam filter using neural networks may need only 10,000 successful classifications to be assigned a value M=1, since the performance of a neural network may decrease with overtraining. The training maturity M may be computed at training and update server 12 (e.g. for an anti-spam filter 34 with no user specificity) and/or at recipient client 20 (e.g. for a user-customized anti-spam filter 34). In some embodiments, a default value for the training maturity M may be provided by training and update server 12, and may be adjusted further at each recipient client 20 to reflect a user's preference.

The filter update age T is a number indicating how old the filter parameters are. In some embodiments, the filter update age T is scaled between 0 and 1, which increases with the time elapsed since the latest update of the respective filter 34. For example, T may be calculated according to the following formula:

$$T = \begin{cases} \dfrac{t}{365}, & \text{if } t < 365 \\ 1, & \text{if } t \geq 365, \end{cases} \quad [2]$$

wherein t denotes the number of days since the latest filter update. Some embodiments of message classifier 30 may disable an anti-spam filter whose T value is 1. In some embodiments, filter update age T forms part of client-side relevance parameters 52b.

The filter aging speed indicator A is a number quantifying how fast the performance of an anti-spam filter 34 declines in time in the absence of updates. In some embodiments, the aging speed indicator is scaled between 0 and 1, where low A values may correspond to a filter whose performance remains strong for a long period of time, while high A values may correspond to a filter which loses relevance quickly. For example, an anti-spam filter based on message layout analysis may have a lower or higher A value than a filter based on detecting the keyword "Viagra®", depending on the relative sensitivity of the performance of each filter to updates. In some embodiments, filter aging speed indicator A may be calculated at training and update server 12 by measuring the performance decrease of the respective anti-spam filter on a message corpus that is updated continuously with the addition of newly discovered spam.

The false positive classification indicator P and false negative classification indicator N are numbers showing the statistical likelihood that the respective anti-spam filter 34 may misclassify a message 40, i.e., the risk that a non-spam message is classified as spam, and the risk that a spam message is classified as non-spam, respectively. In some embodiments, P and N are the false positive classification rate (i.e., the fraction of all messages of a corpus which where wrongly classified as spam) and false negative classification rate (i.e., the fraction of all messages of a corpus which were wrongly classified as non-spam) associated to an anti-spam filter 34, respectively. In some embodiments, the false positive classification indicator P and the false negative classification indicator N are specific to the type of anti-spam filter 34, and form part of server-side relevance parameters 52a.

The filter confidence C indicates both the accuracy and versatility of the respective anti-spam filter 34, and may be a number between 0 and 1, with 1 denoting a high-confidence filter. The filter confidence C quantifies the fact that some anti-spam filters 34 have an inherently higher spam-detecting performance than others. For example, an anti-spam filter based on detecting the word "friend" may be very effective for some spam waves, but overall may not be very reliable, since many legitimate messages may also contain the word "friend". Such a filter may therefore have a relatively low filter confidence. In some embodiments, filter confidence C may form part of server-side relevance parameters 52a.

In some embodiments, filter relevance calculator 36 computes the relevance 70 of an anti-spam filter 34 as a weighted sum:

$$R = \sum_{i=1}^{p} w_i x_i, \quad [3]$$

wherein $x_i$, $1 \leq i \leq p$ are quantities that depend on relevance parameter set 52a-b, while the relevance weights $w_i$, $1 \leq i \leq p$, are numbers between 0 and 1. For example, relevance 70 may be computed according to the formula:

$$R = w_1 M + w_2 TA + w_3 TP + w_4 TN + w_5 TC \quad [4]$$

wherein R denotes relevance 70, M is the filter training maturity, T is the filter update age, A is the filter aging speed indicator, P is the false positive classification indicator, N is the false negative classification indicator, and C is the filter confidence.

In some embodiments, relevance 70 is calculated according to the formula:

$$R = M - T\left[A + \frac{C(N+P) + 2NP}{C^2 + C(N+P) + NP}\right]. \quad [5]$$

Alternatively, relevance 70 may be calculated according to the formula:

$$R = M - T\left[A + \frac{P}{C+P} + \frac{N}{C+N}\right]. \quad [6]$$

For some values of the relevance parameters, equations [5] and [6] may return a negative R. Some embodiments of filter relevance calculator 36 may replace all negative R values with R=0.

As shown in FIG. 3, client-side training engine 56 receives class label 46 from decision module 38, and outputs client-side filter parameters 62b to anti-spam filters 34 and client-side relevance parameters 52b to filter relevance calculator 36. To assess the accuracy of classification, some embodiments of message classifier 30 may request a user input 50 to confirm class label 46 (e.g., "yes, this is spam") or to change class label 46 in case of misclassification ("no, this is not spam"). Additionally, some embodiments of message classifier 30 may use other heuristics to infer whether a message was spam or legitimate. For example, if a message 40 was originally classified as spam, and was deleted in unread form or ignored by the user for a certain time period, message classifier 30 may infer that the respective message was indeed spam.

With every classification of a message 40, client-side training engine 56 may update the values of the false positive classification indicator P and the false negative classification indicator N: P and N may decrease in case of a correct classification and increase in case of misclassification. Some embodiments of the client-side training engine may increase the training maturity M of an anti-spam filter 34 in case of a correct classification.

Besides updating client-side relevance parameters 52b, some embodiments of client-side training engine 56 may also update client-side filter parameters 62b, in order to improve the performance of client-trained anti-spam filters 34.

Figure 4:
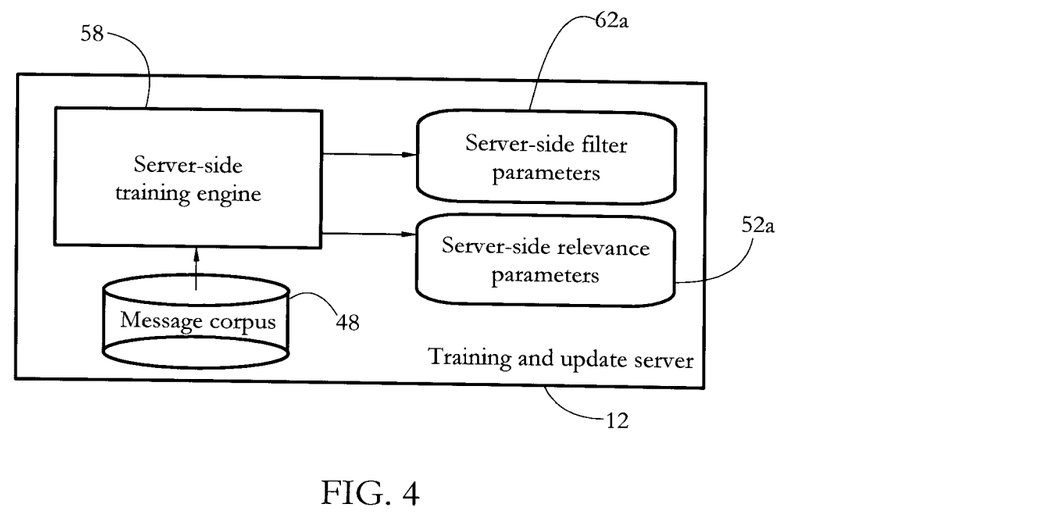
FIG. 4 shows an exemplary internal structure of a training and update server of the system of FIG. 1, according to some embodiments of the present invention.

FIG. 4 illustrates an operational diagram of training and update server 12 according to some embodiments of the present invention. Training and update server 12 includes a server-side training engine 58 and an email message corpus 48. In some embodiments, message corpus 48 includes a collection of email messages 40 associated with unsolicited communication, sorted and indexed into a number of distinct classes 44 (e.g., adult content, phishing, etc.), as well as a collection of legitimate email messages. Message corpus 48 may be kept up to date by the addition of newly discovered spam. In some embodiments, message corpus 48 may reside on computer readable media which may not form part of training and update server 12.

Server-side training engine 58 produces a set of server-side filter parameters 62a and a set of server-side relevance parameters 52a by analyzing message corpus 48. Training and update server 12 makes parameters 52a and 62a available to message classifiers 30 residing on recipient clients over network 16 (FIG. 1).

In some embodiments, server-side relevance parameters 52a are computed for each server-trained anti-spam filter 34 by classifying messages 40 which belong to email corpus 48. Since the class label of each message in email corpus 48 is known, the false-positive classification indicator P and the false negative classification indicator N can be computed directly by estimating the rate of misclassified messages. Filter training maturity M, filter aging speed indicator A and filter confidence C may be estimated by monitoring classification performance on an email corpus 48 which is updated regularly with new additions of spam and legitimate messages. In an embodiment which uses eq. [3] to compute relevance 70, relevance weights $w_i$ for each server-trained anti-spam filter 34 may also form part of server-side relevance parameters 52.

Figure 5:
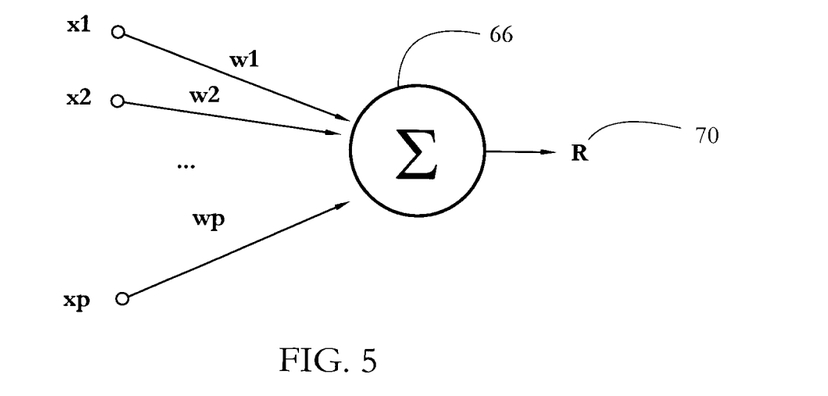
FIG. 5 illustrates the computation of the relevance of an anti-spam filter using an artificial neuron, according to some embodiments of the present invention.

Some embodiments of server-side training engine 58 implement a neural network model to compute relevance weights $w_i$, in which every server-trained anti-spam filter 34 is assigned to a single neuron. FIG. 5 shows an illustrative calculation of relevance 70 of a given anti-spam filter 34 using an artificial neuron. Inputs $x_i$ are multiplied by corresponding weights $w_i$, and a summation module 66 adds all pairs $w_i x_i$. A supervised learning scheme may be used to adapt weights $w_i$ iteratively in order to match a set of inputs x, to a desired relevance R. In some embodiments, the desired relevance R of a server-trained anti-spam filter 34 may be computed using receiver operating curves (ROC).

The exemplary systems and methods described above allow a message classification system to employ several anti-spam filters simultaneously and to dynamically integrate the individual results of the anti-spam filters according to their relative relevance. The relevance of user-trained filters may be balanced with the relevance of server-trained filters so that whenever a server-trained filter has not been updated for a long time or its detection rate is low, greater weight may be given to user-trained filters. Conversely, if a user-trained filter is not being sufficiently trained, its importance in the overall decision process may decrease in favor of an up-to-date server-trained filter.

To illustrate the operation of an exemplary message classification system, a simulation was conducted using three anti-spam filters: a heuristic filter, a user-trained Bayesian filter and a server-trained Bayesian filter. The user-trained Bayesian filter was delivered initially empty (both filter confidence C and training maturity M were initially zero). A simulated user was programmed to constantly train his Bayesian filter, leading to a steady increase of the training maturity M. The server-trained Bayesian filter was delivered with a training corpus of a few million varied samples, resulting in high initial values for the filter confidence C and training maturity M, but with a no-update policy.

Figure 6:
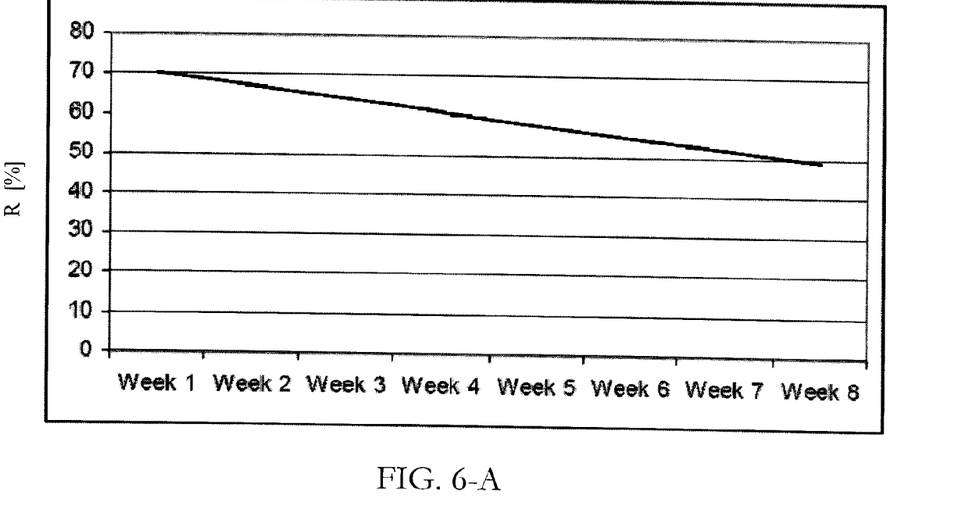

FIG. 6-A shows the relevance of the server-trained Bayesian filter within a period of two months, while FIG. 6-B shows the relevance of the user-trained Bayesian filter during the same period. Both relevancies were calculated according to Eq. [5]. Two months after the latest update, the relevance of the server-trained filter decreased from 70% to 49%. By contrast, due to constant training, the relevance of the user-trained filter was observed to increase from 0 to 72%

It will be clear to one skilled in the art that the above embodiments may be altered in many ways without departing from the scope of the invention. Accordingly, the scope of the invention should be determined by the following claims and their legal equivalents.

What is claimed is:

1. A spam filtering method comprising employing at least one processor to perform the steps of:
computing a relevance of a first anti-spam filter according to a relationship $R=M-T\times f(N,P)$, wherein M represents a training maturity of the first filter, T is an update age of the first filter indicative of a time period since a latest update of the first filter, wherein P is a false positive classification indicator of the first filter, N is a false negative classification indicator of the first filter, and wherein $f$ is a function of N and P;
computing a relevance of a second anti-spam filter according to a training maturity of the second filter, an update age of the second filter indicative of a time period since the latest update of the second filter, a false positive classification indicator of the second filter, and a false negative classification indicator of the second filter; and
determining whether an electronic communication is spam or non-spam according to a first result generated by applying the first anti-spam filter to the electronic communication, a second result generated by applying the second anti-spam filter to the electronic communication, the relevance of the first filter, and the relevance of the second filter.

2. The method of claim 1, wherein computing the relevance of the first filter comprises setting the relevance of the first filter to a value substantially equal to $$R = M - T\left[A + \frac{C(N+P) + 2NP}{C^2 + C(N+P) + NP}\right]$$

wherein A is an aging speed indicator of the first filter, and C is a filter confidence indicative of a spam-identification confidence level of the first filter.

3. The method of claim 1, wherein computing the relevance of the first filter comprises setting the relevance of the first filter to a value substantially equal to $$R = M - T\left[A + \frac{P}{C+P} + \frac{N}{C+N}\right],$$

wherein A is an aging speed indicator of the first filter, and C is a filter confidence indicative of a spam-identification confidence level of the first filter.

4. The method of claim 1, comprising computing the relevance of the first filter at a recipient client connected to an electronic communications server, the recipient client receiving the electronic communication from the electronic communications server, the recipient client including an electronic communication display application for displaying the electronic communication to a user.

5. The method of claim 1, wherein determining whether the electronic communication is spam or non-spam comprises determining a combined classification score substantially equal to $S=S_1 R_1 + S_2 R_2$, wherein $S_1$ and $S_2$ are the first and second classification scores, respectively, and wherein $R_1$ and $R_2$ are the relevance of the first filter and the relevance of the second filter, respectively.

6. The method of claim 1, wherein the electronic communication is an email message.

7. A non-transitory computer readable medium storing instructions, which, when executed by a computer system, cause the computer system to form:
a first anti-spam filter and a second anti-spam filter configured to input an electronic communication and to compute first and second spam classification scores, respectively, for the electronic communication;
a filter relevance calculator configured to compute a relevance of the first anti-spam filter and a relevance of the second anti-spam filter, wherein computing the relevance of the first filter comprises setting the relevance of the first filter to a value substantially equal to $R=M-T\times f(N,P)$, wherein M, T, N, P represent a training maturity of the first filter, an update age of the first filter indicative of a time period since a latest update of the first filter, a false negative classification indicator of the first filter, and a false positive classification indicator of the first filter, respectively, wherein $f$ represents a function of N and P, and wherein the second relevance is computed according to a training maturity of the second filter, an update age of the second filter indicative of a time period since a latest update of the second filter, a second false negative classification indicator of the second filter, and a second false positive classification indicator of the second filter; and a decision module connected to the first and second anti-spam filters and to the filter relevance calculator, configured to determine whether an electronic communication is spam or non-spam according to the first and second spam classification scores, the relevance of the first filter, and the relevance of the second filter.

8. A spam filtering method comprising employing at least one processor to perform the steps of:

computing a relevance of a first anti-spam filter according to a first relevance parameter set, the first relevance parameter set including a training maturity of the first filter, a false positive classification indicator of the first filter, and a false negative classification indicator of the first filter, and an update age of the first filter indicative of a time period since a latest update of the first filter;

computing a relevance of a second anti-spam filter according to a second relevance parameter set, the second relevance parameter set including an a training maturity of the second filter, a false positive classification indicator of the second filter, and a false negative classification indicator of the second filter, and an update age of the second filter, indicative of a time period since a latest update of the second filter; and determining whether an electronic communication is spam or non-spam according to a first result generated by applying the first filter to the electronic communication, a second result generated by applying the second filter to the electronic communication, the relevance of the first filter, and the relevance of the second filter.

9. The method of claim 8, wherein the first relevance parameter set comprises a filter confidence indicative of a spam-identification confidence level of the first filter.

10. The method of claim 8, wherein computing the relevance of the first filter comprises setting the relevance of the first filter to a value substantially equal to $$R = \sum_{i=1}^{p} w_i x_i,$$

wherein $x_i$ represent elements of the first relevance parameter set, wherein $w_i$ are weights, and wherein p is a positive integer.

11. The method of claim 10, comprising determining $w_i$ using a neural network with supervised learning.

12. The method of claim 10, wherein computing the relevance of the first filter comprises setting the relevance of the first filter to a value substantially equal to $R=w_1M+w_2TA+w_3TP+w_4TN+w_5TC$, wherein M, T, P, N represent the training maturity of the first filter, the update age of the first filter, the false positive classification indicator of the first filter, and the false negative classification indicator of the first filter, wherein A is an aging speed indicator of the first filter, and wherein C is a filter confidence indicative of a spam-identification confidence level of the first filter.

13. The method of claim 8, comprising computing the relevance of the first filter at a recipient client connected to an electronic communications server, the recipient client receiving the electronic communication from the electronic communications server, the recipient client including an electronic communication display application for displaying the electronic communication to a user.

14. The method of claim 8, wherein determining whether the electronic communication is spam or non-spam comprises determining a combined classification score substantially equal to $S=S_1R_1+S_2R_2$, wherein $S_1$ and $S_2$ are the first and second classification scores, respectively, and wherein $R_1$ and $R_2$ are the relevance of the first filter and the relevance of the second filter, respectively.

15. The method of claim 8, wherein the electronic communication is an email message.

16. A non-transitory computer readable medium encoding instructions which, when executed by at least one processor, cause the at least one processor to perform the steps of:

computing a relevance of a first anti-spam filter according to a difference between i. a training maturity of the first filter and ii. a product of an update age of the first filter and a function of a false negative classification indicator and a false positive classification indicator of the first filter, computing a relevance of a second anti-spam filter according to a training maturity of the second filter, an update age of the second filter indicative of a time period since a latest update of the second filter, a false negative classification indicator of the second filter, and a false positive classification indicator of the second filter; and determining whether an electronic communication is spam or non-spam according to a first result generated by applying the first anti-spam filter to the electronic communication, a second result generated by applying the second anti-spam filter to the electronic communication, the relevance of the first filter, and the relevance of the second filter.

* * * * *